United States Patent
Athari et al.

(10) Patent No.: US 6,781,352 B2
(45) Date of Patent: Aug. 24, 2004

(54) ONE CYCLE CONTROL CONTINUOUS CONDUCTION MODE PFC BOOST CONVERTER INTEGRATED CIRCUIT WITH INTEGRATED POWER SWITCH AND BOOST CONVERTER

(75) Inventors: Frank Athari, Oceanside, CA (US); Ron Brown, Riverside, CA (US); Jonathan Adams, Rancho Palos Verdes, CA (US)

(73) Assignee: International Rectifer Corporation, El Segundo, CA (US)

( * ) Notice: Subject to any disclaimer, the term of this patent is extended or adjusted under 35 U.S.C. 154(b) by 19 days.

(21) Appl. No.: 10/319,982

(22) Filed: Dec. 16, 2002

(65) Prior Publication Data

US 2004/0113594 A1 Jun. 17, 2004

(51) Int. Cl.[7] .............................. G05F 1/10; G05F 1/40
(52) U.S. Cl. ........................ 323/222; 323/282; 323/266
(58) Field of Search ................................ 323/222, 282, 323/266, 235

(56) References Cited

U.S. PATENT DOCUMENTS

| | | | |
|---|---|---|---|
| 4,533,988 A | 8/1985 | Daly et al. | 365/127 |
| 5,047,912 A | 9/1991 | Pelly | 363/89 |
| 5,278,490 A | 1/1994 | Smedley | 323/284 |
| 5,436,550 A * | 7/1995 | Arakawa | 323/222 |
| 5,530,635 A | 6/1996 | Yashiro | 363/265 |
| 5,550,463 A | 8/1996 | Coveley | 323/300 |
| 5,568,041 A | 10/1996 | Hesterman | 323/222 |
| 5,633,579 A | 5/1997 | Kim | 323/222 |
| 5,686,798 A | 11/1997 | Mattas | 315/244 |

(List continued on next page.)

FOREIGN PATENT DOCUMENTS

| | | |
|---|---|---|
| DE | 2649385 | 5/1978 |
| DE | 19641299 | 4/1998 |
| EP | 0351144 | 1/1990 |
| EP | 0516377 | 12/1992 |
| EP | 0593258 | 4/1994 |
| EP | 0859453 | 8/1998 |
| EP | 0895339 | 2/1999 |
| WO | 0139266 | 5/2001 |

OTHER PUBLICATIONS

Motorola Analog IC Device Data "Power Factor Controllers" 1996 pp. 1–16.
IEEE Transactions on Industrial Electronics, vol. 45, No. 3, Jun. 1998 "Letters to the Editor" Design Considerations for Power Converters Supplying the SAE J–1773 Electric Vehicle Inductive Coupler: 1997 IEEE—pp. 841–847.

(List continued on next page.)

Primary Examiner—Bao Q. Vu
(74) Attorney, Agent, or Firm—Ostrolenk, Faber, Gerb & Soffen, LLP

(57) ABSTRACT

An integrated circuit for a continuous conduction mode (CCM) power factor corrected boost converter circuit, the boost converter circuit including a rectifier connectable to an ac input and having a rectified dc output provided across a dc bus; an inductor having first and second terminals connected in one leg of the dc bus, a first terminal of the inductor coupled to the output of said rectifier; a boost rectifier diode having a first terminal coupled to the second terminal of the inductor and having a second terminal; and a storage capacitor connected to the second terminal of the diode; the integrated circuit comprising a control circuit and a switch controlled by the control circuit, the integrated circuit comprising a housing enclosing the control circuit and switch, the integrated circuit having a power terminal, a ground terminal, a first control input terminal for coupling to an output of the converter circuit, and a second control input terminal for coupling to a sensor for sensing current in the de bus and further having an output terminal connected to the switch for coupling to the second terminal of the inductor, wherein the control circuit comprises a one cycle control circuit having an integrator reset by a clock signal for each cycle of the clock signal, the integrator receiving as an input a signal provided on said first control input terminal.

12 Claims, 3 Drawing Sheets

U.S. PATENT DOCUMENTS

| | | | | |
|---|---|---|---|---|
| 5,886,586 | A | | 3/1999 | Lai et al. ..................... 332/109 |
| 6,011,707 | A | * | 1/2000 | Mine ............................ 363/89 |
| 6,137,165 | A | | 10/2000 | Thierry ........................ 257/690 |
| 6,259,614 | B1 | | 7/2001 | Ribarich et al. ............... 363/89 |
| 6,297,552 | B1 | | 10/2001 | Davis et al. ................. 257/223 |
| 6,297,980 | B1 | * | 10/2001 | Smedley et al. .............. 363/89 |
| 6,307,361 | B1 | | 10/2001 | Yaakov et al. ............... 323/288 |
| 6,388,319 | B1 | | 5/2002 | Cheah et al. ................ 257/223 |
| 6,445,600 | B2 | | 9/2002 | Ben-Yaakov .................. 363/39 |
| 6,545,887 | B2 | * | 4/2003 | Smedley et al. .............. 363/89 |

OTHER PUBLICATIONS

Soft Transitions Power Factor Correction Circuit—202 HFPC May 1993 Proceedings High Efficiency Telecom Rectifier Using A Novel Soft–Switched Boost–Based Input Current Shaper—Robert Streit and Daniel Tollik,—Intelc (Nov. 1991) pp. 720–726.

IXYS—HiperFET Power MOSFETS "Buck & Boost Configurations for PFC & Motor Control Circuits" 2000 pp. 1–5 to 5–5.

BI Technologies—Model 7700 Series "Power Factor Correction Power Module" pp. 7–19 to 7–26.

Intel Dupont Apr. '01 presentation. S. Oliver & M.Soldano Slides 1–8.

Power Integrations, Inc. "Power Factor Correction Using TOPSwitch—Design Note DN–7" Dec. 1995, pp. 1–12.

"A Family of Power–Factor–Correction Controllers", Zheren Lai and Keyue M. Smedley—1997 IEEE pp. 66–73.

International Rectifier Data Sheet No. PD60196—"Integrated Switcher" pp. 1–6.

The Dynamics A PWM Boost Converter With Resistive Input—Sam Ben–Yaakov and Ilya Zeltser pp. 885–891, 1998.

Develop A Single Phase Power Factor Correctio Control Chip—Final Report 1997 for Micro Project 97–161 pp. 1–4.

* cited by examiner-

ONE CYCLE CONTROL CONTINUOUS CONDUCTION MODE PFC BOOST CONVERTER INTEGRATED CIRCUIT WITH INTEGRATED POWER SWITCH AND BOOST CONVERTER

BACKGROUND OF THE INVENTION

The One Cycle Control (OCC) technique for controlling switching circuits is now known. The general technique is described in U.S. Pat. No. 5,278,490. The technique is applied to a PFC (Power Factor Correction) boost converter in U.S. Pat. No. 5,886,586. In the OCC technique, as applied to a PFC boost converter circuit, the output voltage of the converter is sensed, compared to a reference voltage and supplied to an integrator stage, which is reset for each control cycle as set by a system clock. The integrator output is then compared in a comparator to the sensed input current in the converter and the output of the comparator is provided to control a pulse width modulator, whose output controls the boost converter switch. The switch controls the current supplied to the load so that the input ac line current is in phase with the input ac line voltage, i.e., the converter with attached load has a power factor of substantially unity and thus appears purely resistive, resulting in optimum power efficiency as well as reduced harmonics.

Prior to the OCC technique, a multiplier technique was known for PFC in a boost converter circuit. FIG. I depicts a system level block diagram representation of a typical prior art active power factor correction system operating in a fixed frequency, continuous conduction mode (CCM) boost converter topology. The system consists of a continuous conduction mode control integrated circuit 1, based on a multiplier approach, with discrete gate drive circuitry 3 and discrete power switch 5. This control method, based on current mode control, employs the use of a multiplier circuit, input current sensing, input voltage sensing, and output voltage sensing. The analog multiplier creates a current programming signal by multiplying the rectified line voltage by the output of a voltage error amplifier such that the current programming signal has the shape of the input voltage, and average amplitude, which ultimately controls the output voltage of the boost converter. The current loop is programmed by the rectified line voltage such that the input of the converter appears resistive. The output voltage is controlled by changing the average amplitude of the current programming signal. The result is a regulated output voltage and sinusoidal input current in phase and proportional to the input voltage.

The above prior art using the multiplier approach has the disadvantage of high discrete component count and complicated design and development effort required to implement high performance continuous conduction mode power factor correction converters. In addition, it is more difficult to implement a "single package" design wherein the switch is packaged with the control circuit because of the high component count and numbered pins.

An example of a prior art PFC boost converter using the multiplier technique is shown in U.S. Pat. No. 6,445,600. It would be desirable to provide an integrated circuit for a PFC, CCM boost converter having an integrated switch and OCC controller and which reduces the complexity inherent in a PFC boost converter employing the multiplier technique.

SUMMARY OF THE INVENTION

The OCC technique dramatically simplifies the continuous conduction mode (CCM) PFC control function compared to conventional "multiplier" based CCM PFC controllers such as the prior art Unitrode/TI UC3854. The number of package pins are reduced dramatically since the OCC technique does not require line voltage sensing and does not need a complicated multiplier circuit with all its associated external components. The simplicity of this control method thus allows a higher level of integration while allowing use of practical pre-existing power packaging methods for fill integration of the CCM boost PFC controller along with the power switching element all in one package. An example of a packaging method that can be employed is shown in International Publication WO 01/39266 published May 31, 2001.

The present invention thus relates to a single phase, active power factor correction boost converter operating in the continuous conduction mode (CCM). The invention is preferably implemented for continuous conduction mode because this is the most complicated PFC circuit, typically requiring many external components and package pins for the controller. The invention comprises an IC including an active power factor controller based on the OCC technique, integrated gate drive circuitry and integrated power switching device, preferably enclosed in a multi pin power TO-220 or TO-247 package. The IC is packaged with a MOSFEET or IGBT Die preferably using packaging methods in WO 01/39266 above.

According to the invention, there is provided a continuous conduction mode (CCM) power factor corrected boost converter circuit comprising: a rectifier connectable to an ac input and having a rectified dc output provided across a dc bus, an inductor having first and second terminals connected in one leg of the dc bus, a first terminal of the inductor coupled to the output of said rectifier, an integrated circuit comprising a control circuit and a switch controlled by the control circuit, the integrated circuit comprising a housing enclosing the control circuit and switch, the integrated circuit having a power terminal, a ground terminal, a first control input terminal coupled to an output of the converter circuit, a second input terminal coupled to a sensor for sensing current in the dc bus and further having an output terminal connected to the switch and coupled to the second terminal of the inductor, a boost rectifier diode having a first terminal coupled to the output terminal and a second terminal; and a storage capacitor connected to the second terminal of the diode, wherein the control circuit comprises a one cycle control circuit having an integrator reset by a clock signal for each cycle of the clock signal, the integrator receiving as an input a signal provided on said first control input terminal.

The invention also relates to an integrated circuit controller for a CCM PFC boost converter.

Other features and advantages of the present invention will become apparent from the following description of the invention which refers to the accompanying drawings.

BRIEF DESCRIPTION OF THE DRAWING(S)

DETAILED DESCRIPTION OF PREFERRED EMBODIMENTS

Figure 1:
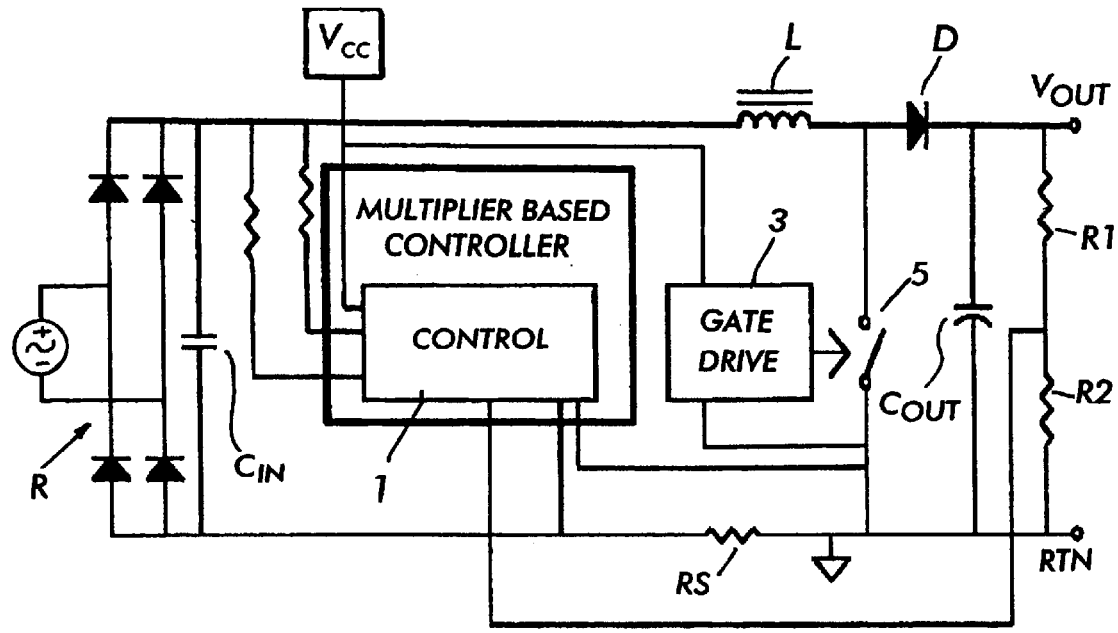
FIG. 1 is a block diagram of a prior art CCM PFC boost converter circuit.
Figure 2:
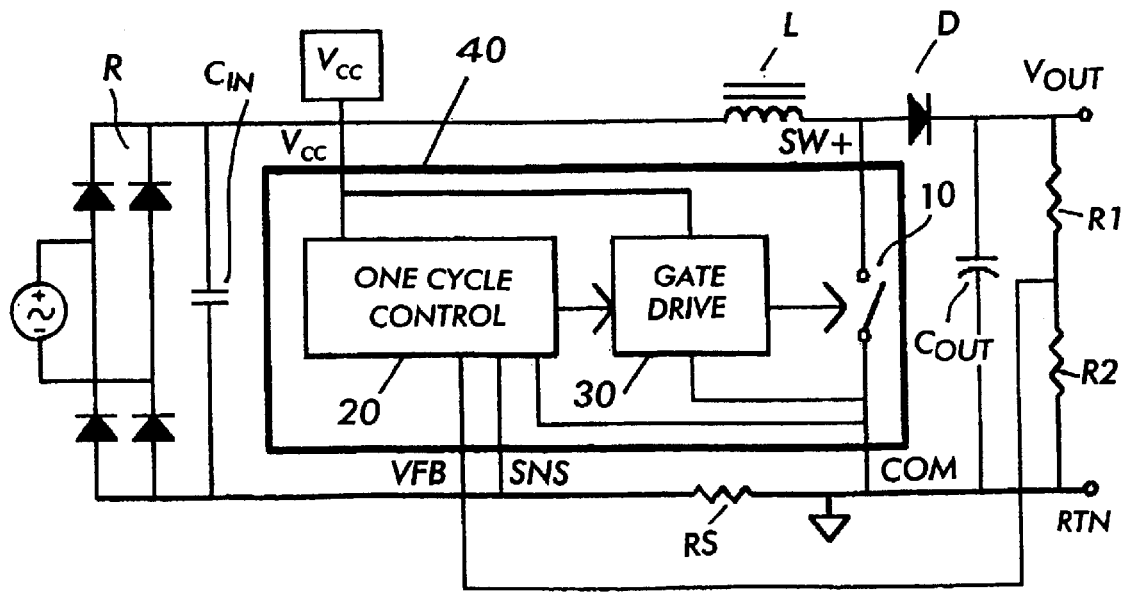
FIG. 2 is a block diagram of a CCM PFC boost converter circuit according to the invention using the OCC technique wherein the switch and controller are housed in a single module.

FIG. 2 depicts a system level block diagram representation of the invention based on the OCC active power factor correction technique operating in a fixed frequency, continuous conduction mode boost converter topology. In CCM, the current in the inductor L is never allowed to become zero. According to the invention, the power switch 10 and the OCC based PFC control circuit 20 with on board power switch driver 30 are integrated into a single package 40 capable of dissipating appropriate heat from the device to a heat sink. Various power packages can be employed using this technique since the number of pins required to implement a full CCM PFC boost converter is reduced with the use of the OCC technique.

The control circuit 20 is based on the OCC method in which the multiplier and input voltage sensing referred to in the prior art are not required. This allows package pins and external components of the IC 40 to be reduced. The OCC concept is realized with a simple linear circuit incorporating integration-reset control, in which the duty cycle of the switch 10 is controlled in real-time such that the average value of the switched variable in each cycle is equal to or proportional to a control reference. In particular, the output voltage of the converter is compared to the control reference by an error amplifier. This error signal is integrated. The magnitude of the error controls the slope of the integrator output, which is then compared to the sensed input current to control the duty cycle of the switch. This control method forces the input of the converter to appear resistive, thus forcing a sinusoidal input current in phase and proportional to the input voltage, and providing a regulated DC output voltage. Integrating the controller along with the power switch in one package simplifies the complicated task of designing a continuous conduction mode PFC circuit as compared to traditional discrete multiplier based CCM PFC controllers.

Again, with reference to FIG. 2, the rectifier block R provides a rectified dc voltage to the dc bus. An input capacitor Cin filters high frequency content. When switch 10 is on, electromagnetic energy is stored in inductor L. When the switch 10 is turned off, the stored energy in inductor L is transferred via high frequency rectifier diode D to storage capacitor $C_{out}$, providing power to the load. When the switch 10 again is on, diode D is reverse biased and storage capacitor $C_{out}$ provides power to the load. The duty cycle of switch 10 is controlled by OCC circuit 20 such that the ac input current is in phase with the ac line voltage. The converter and load thus have a near unity power factor and appear to be purely resistive, resulting in maximum power efficiency. A sense resistor RS is provided for sensing the input current.

Figure 3:
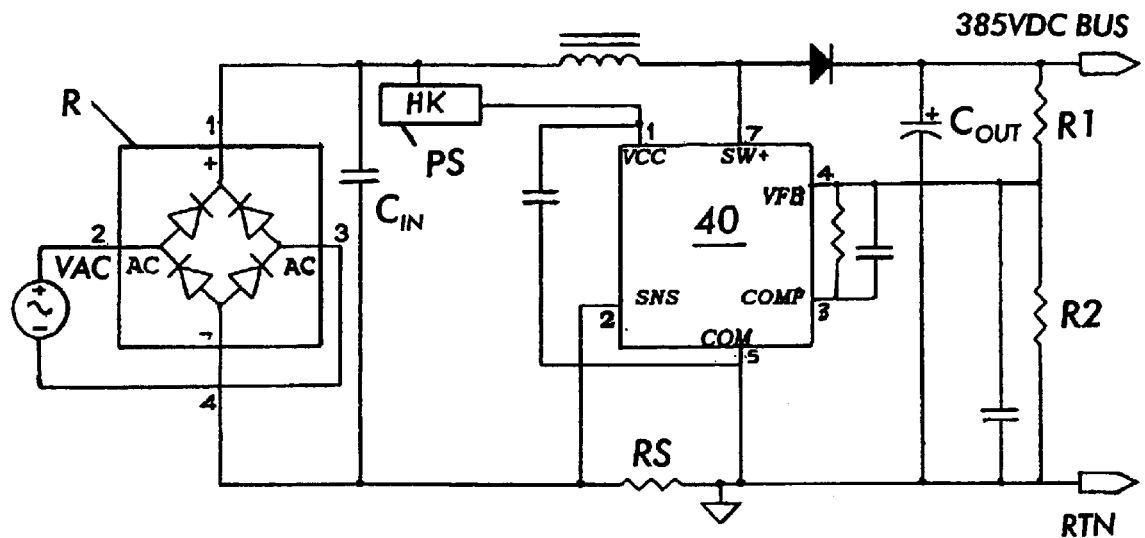
FIG. 3 shows one implementation of the integrated circuit according to the invention.
Figure 4A:
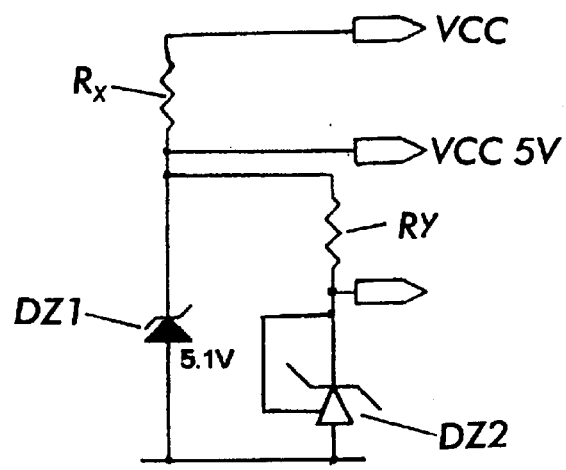
FIG. 4A shows how power and reference voltages are generated for the integrated circuit.
Figure 4:
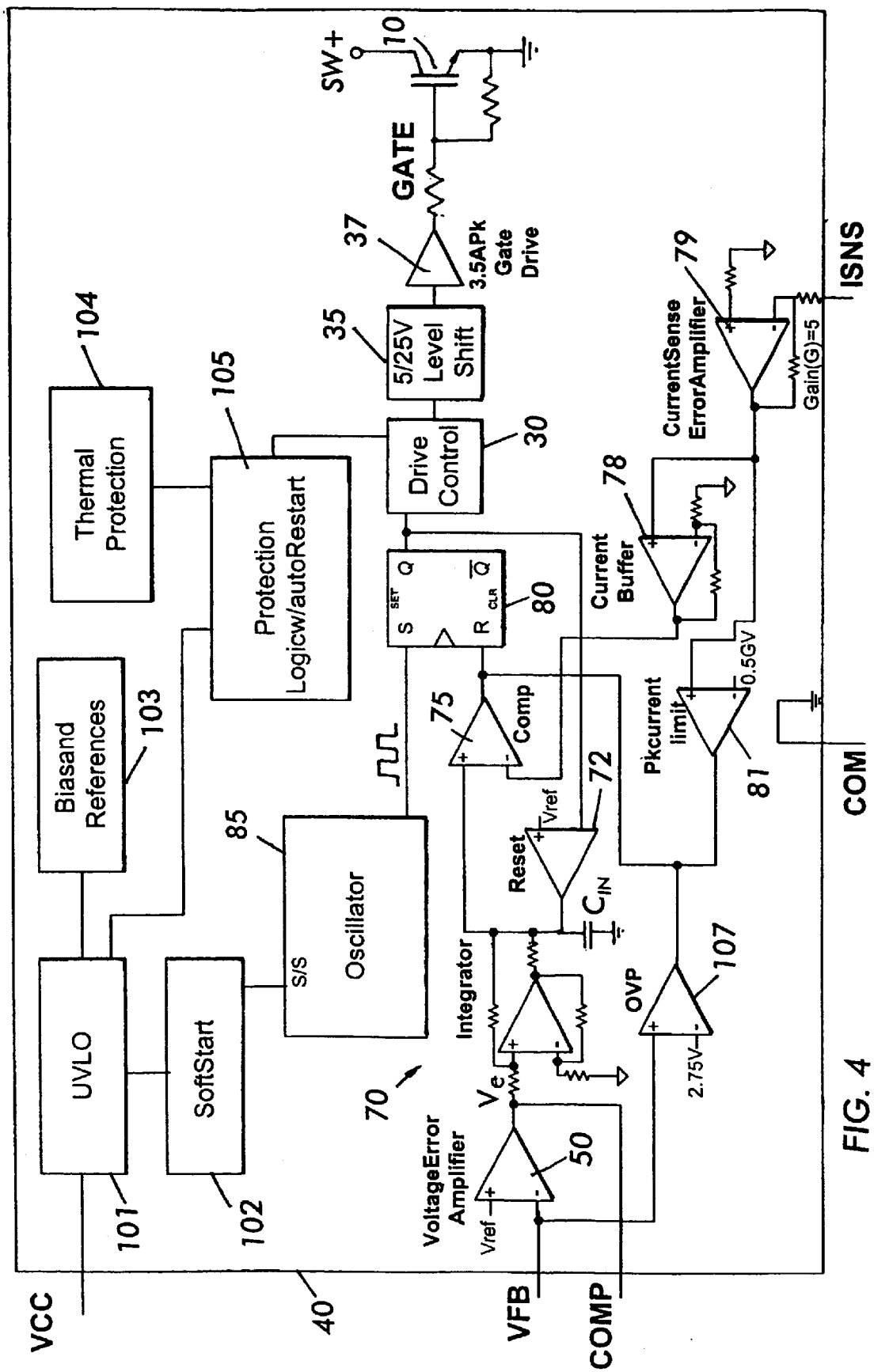
FIG. 4 shows the block diagram of the integrated circuit according to the invention.

FIG. 3 shows details of one implementation of the integrated circuit 40 applied to a PFC CCM boost converter and FIG. 4 shows the block diagram of IC 40. IC 40 is preferably provided with power by a power supply PS which receives power from the DC bus. Internally, in IC 40, a voltage regulator circuit comprising a resistor RX and zener diode DZ1 can be employed to provide internal power (VCC 5V). See FIG. 4A. A reference voltage Vref for the error amplifier can also be provided by a similar circuit including a resistor RY and zener diode DZ2 as shown in FIG. 4A.

With reference also to FIG. 4, the output voltage is sensed by resistor divider $R_1$, $R_2$ and provided to input VFB of IC 40, which is one input to an error amplifier 50. The other input of error amplifier 50 is the reference voltage Vref. The error amplifier 50 generates an error signal Ve. The amplified error signal Ve is provided to the input of an integrator stage 70. The output of the integrator is provided to one input of comparator 75, where it is compared to the sensed input current, provided by the output of current buffer 78 which is fed by current sense amplifier 79. The input current is converted to a voltage by resistor Rs and provided to input ISNS. A peak current limiter 81 operates to limit the current sensed to a predefined peak current. The output of peak current limiter 81 is provided to the output of comparator 75. The output of the comparator 75 is provided to a driver stage, e.g., a clocked SR flip flop 80, the output of which is provided to control the conduction time of switch 10. A system clock 85 controls the system frequency. The output of flip flop 80 is thus a pulse width modulated signal whose pulse width determines the on time of switch 10. The output of the integrator 70, which is responsive to the average value of the variation of the output voltage from the desired reference V ref, is compared to the input current waveform (as determined by the voltage drop across Rs) by comparator 75 to reset flip flop 80 when the integrator output exceeds the sensed input current. This modulates the on time of the switch 10, forcing the input current to follow the input voltage in phase and regulating the output voltage to minimize the error signal Ve. The clock sets the system frequency, ensuring that in each clock period, the integrator is reset. Reset of the integrator is accomplished via reset controller 72 when the output of flip flop 80 is reset.

The advantages of the invention are (a) lower component count; (b) higher reliability due to lower parts count; (c) simpler PCB implementation; (d) minimized layout issues due to tight packaging of critical components of the control and power switching components; and (e) simplified design and development effort based on the simpler OCC method as opposed to the more complex multiplier based PFC controllers.

In addition, IC 40 includes other standard functions such as under voltage/low voltage (UVLO) detection circuitry 101, soft start circuitry 102, necessary bias and reference voltage generators 103, thermal protection 104, circuit protection logic with automatic restart 105 (for such functions as over-current protection and output over-voltage protection 107). Further, integrated drive control 30, level shifting circuitry 35 and peak current limiting gate drive circuitry 37 are also provided.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A continuous conduction mode (CCM) power factor corrected boost converter circuit comprising:

a rectifier connectable to an ac input and having a rectified dc output provided across a dc bus;

an inductor having first and second terminals connected in one leg of the dc bus, a first terminal of the inductor coupled to the output of said rectifier;

an integrated circuit comprising a control circuit and a switch controlled by the control circuit, the integrated circuit comprising a housing enclosing the control circuit and switch, the integrated circuit having a power terminal, a ground terminal, a first control input terminal coupled to an output of the converter circuit, and a second control input terminal coupled to a sensor for sensing current in the dc bus and further having an output terminal connected to the switch and coupled to the second terminal of the inductor;

a boost rectifier diode having a first terminal coupled to the output terminal of the integrated circuit and having a second terminal; and a storage capacitor connected to the second terminal of the diode;

wherein the control circuit comprises a one cycle control circuit having an integrator reset by a clock signal for each cycle of the clock signal, the integrator receiving as an input a signal provided on said first control input terminal.

2. The converter circuit of claim 1, wherein the integrated circuit includes a gate driver for driving the switch receiving an output from the control circuit.

3. The converter circuit of claim 1 wherein the switch comprises a MOSFET or IGBT.

4. The converter circuit of claim 1, further comprising a voltage divider circuit across the output of the converter for supplying an output voltage sense signal to said first control input terminal.

5. The converter circuit of claim 1, further comprising a sense resistor in one leg of said dc bus, one terminal of the sense resistor being coupled to the second input terminal.

6. The converter circuit of claim 1, wherein the housing comprises a TO-220 or TO-247 package.

7. An integrated circuit for a continuous conduction mode (CCM) power factor corrected boost converter circuit, the boost converter circuit including a rectifier connectable to an ac input and having a rectified dc output provided across a dc bus; an inductor having first and second terminals connected in one leg of the dc bus, a first terminal of the inductor coupled to the output of said rectifier; a boost rectifier diode having a first terminal coupled to the second terminal of the inductor and having a second terminal; and a storage capacitor connected to the second terminal of the diode; the integrated circuit comprising:

a control circuit and a switch controlled by the control circuit, the integrated circuit comprising a housing enclosing the control circuit and switch, the integrated circuit having a power terminal, a ground terminal, a first control input terminal for coupling to an output of the converter circuit, and a second control input terminal for coupling to a sensor for sensing current in the dc bus and further having an output terminal connected to the switch for coupling to the second terminal of the inductor;

wherein the control circuit comprises a one cycle control circuit having an integrator reset by a clock signal for each cycle of the clock signal, the integrator receiving as an input a signal provided on said first control input terminal.

8. The integrated circuit of claim 7, further including a gate driver for driving the switch receiving an output from the control circuit.

9. The integrated circuit of claim 7, wherein the switch comprises a MOSFET or IGBT.

10. The integrated circuit of claim 7, further wherein the boost converter circuit includes a voltage divider circuit across the output of the converter for supplying an first control input terminal.

11. The integrated circuit of claim 7, further wherein the boost converter circuit includes a sense resistor in one leg of said dc bus, one terminal of the sense resistor for coupling to the second input terminal.

12. The integrated circuit of claim 7, wherein the housing comprises a TO-220 or TO-247 package.

* * * * *

UNITED STATES PATENT AND TRADEMARK OFFICE
CERTIFICATE OF CORRECTION

PATENT NO. : 6,781,352 B2  
DATED : August 24, 2004  
INVENTOR(S) : Frank Athari, Ron Brown and Jonathan Adams It is certified that error appears in the above-identified patent and that said Letters Patent is hereby corrected as shown below:

Title page,
Item [73], Assignees, change to
-- International Rectifier Corporation, El Segundo, CA (US) --.

Signed and Sealed this

Fourteenth Day of December, 2004

JON W. DUDAS
*Director of the United States Patent and Trademark Office*